United States Patent [19]

Smith-Johannsen

[11] 4,352,694

[45] Oct. 5, 1982

[54] PROCESS OF PRODUCING SOREL CEMENT

[75] Inventor: Robert Smith-Johannsen, Incline Village, Nev.

[73] Assignee: Norcem A.S., Oslo, Norway

[21] Appl. No.: 202,691

[22] Filed: Oct. 31, 1980

Related U.S. Application Data

[63] Continuation-in-part of Ser. No. 169,984, Jul. 18, 1980, abandoned.

[51] Int. Cl.$^3$ ............................................. C04B 9/02
[52] U.S. Cl. ................................... 106/106; 106/107
[58] Field of Search ..................... 106/105, 106, 107

[56] References Cited

U.S. PATENT DOCUMENTS 2,543,959  3/1951  Eastin ................................. 106/106

*Primary Examiner*—James Poer
*Attorney, Agent, or Firm*—Pennie & Edmonds

[57] ABSTRACT

A process for producing magnesium oxychloride hydrate cements which involves forming a mixture of water, magnesium chloride hydrate and magnesium oxide in which a minor portion of the magnesium oxide is treated to render it initially substantially unreactive with the magnesium chloride hydrate but capable of slowly reacting with the magnesium chloride hydrate after the initial exotherm reaction of the reactive portion of the magnesium oxide with the magnesium chloride hydrate.

5 Claims, No Drawings

PROCESS OF PRODUCING SOREL CEMENT

This application is a continuation-in-part of application Ser. No. 169,984 filed July 18, 1980, now abandoned.

TECHNICAL FIELD

Process for producing magnesium oxychloride hydrate cements (Sorel cement) compositions.

BACKGROUND ART

Sorel cement is a term used to refer to various cured compositions having as basic ingredients a combination of magnesia (MgO) and magnesium chloride ($MgCl_2$). This basic Sorel system when cured is a magnesium oxychloride hydrate.

Sorel cement was discovered almost 100 years ago. It gets harder, and sets faster than Portland cement, but its widespread use has been greatly limited because of its inherent poor water resistance. The cured Sorel cement as it is known today is also somewhat soluble in water with the result that exposure to water virtually eliminates the adhesion between the crystals.

It is obvious from repeated statements in the literature that had it not been for the water sensitivity of Sorel cement products, their use would have been much more general and widespread. It is exactly because of this drawback of these cement products that there remains a large potential for these materials if the water sensitivity problem could be solved. The superior hardening rate, greater strength and excellent fire retardant properties of Sorel cement could then be taken advantage of in a host of building materials where its use is presently not considered.

Various attempts have been made to overcome this difficulty by the addition of materials which have the property of forming insoluble magnesium salts, such as phosphates and aluminates. Materials such as waxes, oils and metal soaps have also been added to improve water resistance (See U.S. Pat. Nos. 2,703,762 and 3,753,750, for example). The results have been only partially successful and in fact usually with the further disadvantage that the hardening rate is greatly slowed.

Phosphoric acid and phosphates have been added to Sorel cements for various reasons, such as to improve wet strength, to control viscosity, to reduce contraction upon curing, etc. The prior art presently known to the applicant involving the addition of phosphoric acid or phosphates to Sorel cements are U.S. Pat. Nos. 4,141,744; 3,320,077; 2,702,753; 2,543,959; 2,351,641; 1,853,522; 1,019,083, and a Supplementary Paper Section III, THE VI INTERNATIONAL CONGRESS ON THE CHEMISTRY OF CEMENT, Moscow, September, 1974.

Some of the above problems have been solved as disclosed in U.S. Pat. No. 4,209,339 dated June 24, 1980, by the present applicant. That patent concerns the use of ethyl silicate additive to improve water resistance and to the use of a premix of water, magnesium chloride, and a small amount of magnesium oxide with which the remainder of the Sorel cement ingredients are mixed.

DISCLOSURE OF THE INVENTION

The present invention is directed to an improved water and weather resistant cured Sorel cement product having improved strength, and to improvements in the process for producing Sorel cement compositions, for the control of the viscosity, pot life and exotherm reaction, all of which are necessary for a practical production process.

According to the present invention, a premix is prepared by mixing water, a minor portion of the total required MgO, and a reaction inhibitor. The premix is allowed to stand a short time to allow the reaction inhibitor to take effect, the $MgCl_2.6H_2O$ is then added to the premix together with the balance of the MgO and any other ingredients desired, such as inert fillers, pigments, ethyl silicate, etc.

Obviously, in view of the prior art noted above, the applicant is not the first to employ phosphoric acid or phosphoric acid salts in Sorel cement compositions. Some of applicant's claimed advantages are also noted in the prior art, such as improved wet strength, viscosity control, etc. However, as the phosphoric acid or salts are employed in the prior art, the advantages claimed or obtained are always offset by accompanying disadvantages which renders the process as a whole commercially unfeasible. For example, the addition of phosphoric acid to the final mixture of MgO and $MgCl_2.6H_2O$ may improve the wet resistance and alter the viscosity as claimed, but when added in this manner and in an amount sufficient to give significant improvement in the water resistance the cure time is so retarded as to render the process commercially impracticable or the composition incompletely cured.

Applicant's invention, as it pertains to the use of phosphoric acid as an inhibitor, resides in manner of using phosphoric acid and its water soluble salts and compounds and in the particular phosphoric acid salts and compounds employed.

Applicant's process provides a final MgO-$MgCl_2.6H_2O$ mixture with a significantly good pot life, and permits the introduction of a sufficient amount of reaction inhibitor into the composition to materially improve the water and weather resistance of the final cured product without retardation of the cure time while at the same time obtaining excellent viscosity before and during curing and a controlled exothermic reaction. In fact, the cure time is surprisingly decreased over the normal cure time of Sorel cements without any non-inert additives.

The purpose of treating a minor part of the MgO separately in a premix is to delay, or entirely prevent, the reaction of this minor part of the MgO with the $MgCl_2.6H_2O$ during the main reaction and making it available later for a slow reaction with $MgCl_2$. This not only permits control of the reaction from a process standpoint, such as reaction temperature, exotherm, pot life, viscosity and time of reaction, but results in a final cured product of improved strength, water resistance, and loss of material on dry-wet cycling.

The reaction of part of the MgO can be inhibited or delayed in various manners. For example, part of the MgO used to form the Sorel cement can be treated with phosphoric acid or a reactive phosphoric acid salt or compound and the premix allowed to stand until all of the phosphoric acid has been used up or reacted. The magnesium chloride can then be added together with the remainder of the MgO, inert fillers, pigments, etc. Part of the MgO can also be treated with or encased by an oil, such as linseed oil or silicone oil.

Other reaction inhibitors include water soluble silicates or sols, such as sodium stabilized silicates (silica) sols marketed by DuPont under the tradename LUDOX HS-40, lithium stabilized polysilicates, such as those marketed by DuPont under the tradename POLYSILICATE 48, hydrolized silicates, low sodium polysilicates, such as water glass, siliconates, such as potassium siliconate, and tin salts, such as stannous chloride. The lithium stabilized polysilicates have been found to be the most advantageous reaction inhibitor to date. In addition to the improved properties obtained with this polysilicate inhibitor, improved pot life is obtained since its addition does not cause the evolution of heat.

The phosphoric compounds that can be used according to this invention are phosphoric acid and the water soluble phosphoric acid salts or compounds, such as ammonium phosphate, sodium phosphate and the like. The phosphorous compounds should have a sufficient acidity to react fairly rapidly with MgO. Phosphoric acid is preferred at present over its salts.

The amount of reaction inhibitor that can be used will depend upon the particular inhibitor selected and the degree of water resistance and strength desired in the final cured product. Reactive inhibitors, i.e., those that actually react chemically with MgO, such as phosphoric acid and its reactive salts, are treated somewhat differently with respect to the amounts to be used than the non-reactive type inhibitor, such as the silicates. The reactive inhibitors should not be used in any significant excess in the premix since the excess will also react with the MgO or the $MgCl_2.6H_2O$ in the main mix and interfere with the curing as explained below.

The optimum amount of phosphoric acid (85%) found to date is about 5 percent by weight based on the MgO used to form the premix. The effect of amounts less than 5 percent has not been determined except that 0.2 to 0.5 percent by weight phosphoric acid appears to have little or no effect in improving the water resistance of the cured Sorel cement. The one limiting factor here is of a practical nature. If a high percentage of the MgO, e.g., 85% of total amount to be used, is employed in the premix with all of the external water, more phosphoric acid could be used but the mix becomes so viscous as to render adequate mixing of the other ingredients, $MgCl_2.6H_2O$, fillers, etc., extremely difficult. Therefore, as a practical matter, the amount of MgO used in the premix is limited to that amount which will permit ease of blending the other ingredients in the premix. Generally, when the MgO used in the premix is above 25% of the total MgO employed, the viscosity begins to rise and mixing problems begin. This practical limit on the amount of MgO that can be used in the premix with phosphoric acid thus places a practical limit on the amount of phosphoric acid that can be employed since it cannot be in any significant excess of that which will react with the MgO present. However, 5% by weight of phosphoric acid based on 25% by weight of the total MgO employed gives excellent results.

With regard to other non-reactive reaction inhibitors, the amounts are more flexible since it is not too important to avoid an excess in the premix. A low sodium silicate, for example, has been used in amounts as high as 20 parts per weight (dry powder) based on 100 parts of MgO. For economic reasons, it is desirable to use as small amount as possible and yet obtain the optimum results desired. A low sodium or lithium polysilicate can generally be used in 2 to 4 parts by weight of a 20% solid aqueous solution per 100 parts by weight of MgO.

The objective is not to slow down the reaction but to prevent the reaction of some of the MgO to some extent during the initial exotherm reaction so that the inhibited MgO can later more slowly react with the magnesium chloride. The exotherm reaction is, in fact, not slowed down by the presence of the inhibited MgO. It is theorized that the inhibitors isolate the MgO dispersed in the water, and as the water is used up the inhibited MgO then gradually becomes available for reaction. This latter reaction is evidenced by the greatly improved strength of the cured products and the reduction in loss of material on dry-wet cycling, since if unreacted salts were present they should leach out during dry-wet cycling and cause a significant loss of material or weight.

In preparing the premix with reactive inhibitor such as phosphoric acid, it is advantageous to first mix the phosphoric acid with the water and then mix in the MgO. A reaction then occurs between the acid and the MgO causing a rise in the pH. The reaction should be allowed to go to completion (about one hour) and there should be substantially no acid remaining in the premix. A pH of 9 to 10 will generally indicate an absence of acid. If acid is present, additional MgO can be added. Non-reactive inhibitors can be mixed in any desired manner and the mixture allowed to stand (generally about 5 minutes) until the inhibition effect has taken place.

The amount of MgO which can be used in the premix is not critical but is preferably less than about 25 percent by weight of the total amount of MgO needed to form the cement. A sufficient amount of MgO should be employed in the premix to impart the desired water resistance and process controls, such as viscosity. Improved results appear when the amount of MgO in the premix is about 5 percent of the total amount of MgO being employed, but experiments to date indicate that 15% to 25% by weight is preferred. The limit on the maximum MgO that can be used in the premix is mechanical, i.e., when more than about 25% is employed the premix starts to become viscous and mixing becomes more difficult. Adding water is excess of the minimum to overcome this problem would only detract from the advantages of the process, and the water sensitivity of the resulting products. Therefore, the maximum amount of MgO should be that which can easily be mixed using a minimum amount of external water, e.g., about 25 parts of water per 100 parts of MgO. Thus, the term minor amount of MgO, as used herein, means that amount which produces a mixable viscosity as a practical matter.

It is also advantageous to employ all of the external water to be used to form the curable cement composition in the premix. This surprisingly permits the use of less water than would ordinarily be required when the water is added in any other manner. This not only results in a better water resistant cured cement product, but it also results in improved viscosity and control thereof during processing.

The main object of the invention is to obtain a water resistant cured Sorel cement of sufficient strength for use in the building industry, but this object must be obtained through a practical process to be of industrial significance. The formation of the premix and its use as herein described not only results in an improved water resistant Sorel cement of improved strength and allowing the use of less water than would normally be required, but further results in a composition within the most desired viscosity range (5000 to 6000 cps.) for curing, a composition having a controllable exothermic reaction, very little thixotropy, and a significantly reduced initial curing time.

If an inhibitor is added to the total mixture of $MgCl_2.6H_2O$ and MgO, a reduction in the total amount of water required cannot be obtained because the viscosity or consistency of the reaction mixture becomes excessive requiring more water, the curing is significantly retarded and the exotherm decreases significantly.

In the absence of the premix procedure of this invention, the final normal $MgO-MgCl_2.6H_2O$ mixture with only inert additive, such as fillers, must go through an incubation period of about four hours before any accelerated curing takes place, and the end product has very poor physical properties and water resistance. Using the premix procedure of this invention, the curing can take place immediately at elevated temperature and the product can be demolded in three hours compared to a demolding time of 16-18 hours in the absence of the premix procedure.

A very small amount of a phosphoric acid can be added to the final mixture if it is desired to slow the cure or reduce the exotherm reaction temperature. This may be advantageous in a thick product or foams if the exotherm is too great. About 0.2 to 0.4 parts (based on 100 parts MgO) by weight of $H_3PO_4$ (85%) is generally sufficient to give a retardation of the cure time. This amount of $H_3PO_4$ is not sufficient to give any significant improvement of the water resistance of the cured product even if added to the premix. Conversely, if the amount of acid used to achieve significantly improved water resistance is added to the final mixture, the retardation is so severe that the compositions never cure properly. By these means, water resistance and exotherm (cure speed) can be controlled independently by acid addition to the premix and to the final mixture.

It is also advantageous to employ ethyl silicate in accordance with the teachings in U.S. Pat. No. 4,209,339 to further enhance the water resistance. The ethyl silicate can be added to the mixture at any stage, but when added to the premix, as in Example 1, it should be partially hydrolyzed. Unhydrolyzed ethyl silicate is not compatible and tends to separate into tiny bubbles and therefore difficult to effectively disperse. Fully hydrolyzed ethyl silicate causes the premix to thicken, but partially hydrolyzed ethyl silicate can be easily blended without adverse effect on the viscosity.

Although a significant improvement in the water resistance of Sorel cement was made following the process disclosed and claimed in applicant's U.S. Pat. No. 4,209,339, the cured product had excessive dimensional changes due to variable moisture conditions and gradual loss of strength due to wet-dry cycling. Both of these conditions are radically improved by practicing the process according to this invention. Wet expansion, for example, is reduced from 0.8% to between 0.05 and 0.1%. Expansion up to 0.4% is tolerable.

The cured product is tested for water resistance by boiling it in tap water for about 3 hours. Although the product has excellent resistance when subjected to this unusually severe water immersion test, it has been observed that some of the products are seriously affected by running water, such as by rainfall in an outdoor environment. The surface appears to dissolve or be leached away. It has also been observed that this surface leaching effect of running water seems to be autocatalytic, that is either the leaching takes place continuously or it doesn't start at all. If the cured hydrate, however, is dipped in very dilute, hot $H_3PO_4$ (1-2% aqueous solution) and the treated cured hydrate allowed to react by natural aging, a surface is developed which resists this leaching or dissolving effect to a high degree. The treatment with the dilute $H_3PO_4$ leaches out a small amount of the surface material and develops some microporosity. The $H_3PO_4$ treatment may be removing some reaction breakdown products of the hydrate which causes further solution of the surface when subjected to running water.

It has been further observed that if the water in which the cured hydrate is submerged (for the submersion test in boiling water) contains certain ions such as magnesium ions and is at a pH of about 7 that the leaching by running water is inhibited. It has been found, however, that a small amount of gypsum ($CaSO_4.2H_2O$) in the water is even more effective. Excellent resistance to running water is achieved by combining these effects by dipping the cured hydrate into a boiling 1% aqueous solution of $H_3PO_4$ for one minute, and drying, dipping the so treated hydrate into a polymer latex, such as a 10% acrylic polymer latex, containing 1 to 3% by weight gypsum, and then allowing the hydrate to dry and age naturally. The microporosity obtained by the $H_3PO_4$ treatment permits the latex to bond well to the surface of the hydrate. The particular adhesive polymer is not of particular significance, as most any polymer could be used. The sole function of the polymer is that of a binder to retain the gypsum in place to guarantee the desirable ion atmosphere for resistance to the surface degraded by running water.

The following examples (parts are by weight) serve to illustrate the invention.

EXAMPLE 1

A premix is formed by a fairly violent mixing 25 parts water, 25 parts MgO and 5 parts of 85% phosphoric acid at room temperature. Initially the pH of the premix is quite low due to the free acid content. With continued agitation and aging (about 1 hour), the acid reacts with the MgO and the pH rises to about 9-10. After the aging and the rise in pH to about 9 or 10, the premix is ready for use. This particular premix has a shelf life of about one day.

After the pH has risen above 8, 2.2 parts of partially hydrolyzed ethyl silicate is added to the premix.

56 parts of $MgCl_2.6H_2O$ are then added to the premix, after which a previously prepared dry mixture of 75 parts of MgO, 20 parts Feldspar (filler) and 2.2 parts of $TiO_2$ (color) are added to form the final mixture ready for curing. The viscosity of the mixture remains low and workable depending mainly on the temperature, and can vary from about 3000 to 6000 centipoises. The mixture may start out at a viscosity of about 8000 cps. and then gradually decrease and begin to increase slowly.

In contrast, if the same total amounts of water, MgO and $MgCl_2.6H_2O$, namely 25 parts, 100 parts and 56 parts, respectively, are mixed to form a final mixture, and the same amount (5 parts) of phosphoric acid is added, the viscosity after about 5 minutes is about 24,000 cps., and it rapidly increases to about 26,000 in about 2 minutes. Thus, more water must be added to control the viscosity resulting in decreased water sensitivity. In addition the cure rate is very slow and the exotherm is substantially reduced.

The initial addition of the $MgCl_2.6H_2O$ to the premix advantageously produces a thin composition which permits the easy blending of the remaining dry ingredients.

The final mixture was allowed to stand for one hour at about 50° C. It was then placed in an oven and cured. The maximum exotherm temperature was 110° C. and the total curing time was 1 hour and 40 minutes. The viscosity after 20 minutes was 3200 cps. and after one hour 4480 cps. The product had excellent hardness which was retained after boiling the product in water for 3 hours. The product was then treated with dilute phosphoric acid and gypsum in a 10% acrylic latex as described above. The product showed no evidence of deterioration when subjected to running water.

EXAMPLE 2

A premix of 25 parts of water and 25 parts of magnesium oxide was prepared and 5% by weight of 85% phosphoric acid was then added. This premix was allowed to stand until all of the phosphoric acid had reacted and the pH of the premix was about 9. 56 parts of magnesium chloride hexahydrate was added to this premix and then the remaining 75 parts of the magnesium oxide. The composition was then allowed to cure in a suitable container.

EXAMPLE 3

A premix of 25 parts of water with 2 parts of a solution (20% solids) of lithium stabilized polysilicate marketed by DuPont under the tradename POLYSILICATE 48 was prepared. 25 parts by weight of magnesium oxide was then added and the premix allowed to stand for 5 minutes. 56 parts of magnesium chloride hexahydrate was then added to this premix (the premix becomes thin upon the addition) followed by the remaining 75 parts of the magnesium oxide.

A 1:1 mixture of linseed oil and MgO was then prepared and 4 parts of this mixture added to the mixture. The composition was then allowed to cure in a suitable container.

EXAMPLE 4

A mixture of 25 parts of water, 100 parts of magnesium oxide, and 56 parts of magnesium chloride hexahydrate was prepared in a conventional manner and was allowed to cure naturally in a suitable container.

To each of the above compositions, 5% by weight of glass fibers were also added with the addition of the MgO to the premixes.

All three cured products were stabilized before testing by heating them in an oven for 22 hours at 64° C. The products were then weighed and this weight was used to calculate the weight loss set forth in the Table below. The products were then subjected to the strength test as listed in the Table. The composition of Example 2 had an initial bending strength of 36 and an elastic modulus of 11.5, while composition 3 had an initial bending strength of 64 and an elastic modulus of 19. The cured products were then subject to 8 dry-wet cycles (2 days dry, one day wet) at room temperature and the weight loss and water absorption measured and the strengths of products of Examples 2 and 3 were remeasured after the 8th cycle. The results are as reported in the following Table.

TABLE

| | Ex. 2 | Ex. 3 | Ex. 4 |
|---|---|---|---|
| Weight loss (material) | −3.4% | +0.1% | −7% |
| Water adsorption | 7.0% | 2.4% | 12% |
| Bending Strength (MPA) | 32 | 40 | disintegrated |
| Elastic Modulus (MPA) | 8.8 | 8 | disintegrated |

After the dry-wet cycling, the composition of Example 2 had a bending strength of 32 and elastic modulus of 8.8, while the composition of Example 3 had a bending strength of 40 and elastic modulus of 8. It is noted, however, that the addition of fillers, such as Feldspar, to these compositions would considerably improve the elastic modulus.

As can be observed from the Table, the Example 4 control product disintegrated when subjected to the strength tests after 8 dry-wet cycles. It is significant to note that the product of Example 3 actually showed a weight gain indicating that further reaction with the water used in the cycling probably took place.

The increase in strength and reduction of water adsorption of Example 3 over Example 2 is primarily due to the post addition of the oil-MgO mixture. With oil alone less water adsorption is observed but no increase in strength. The oil encased MgO added in this manner gives additional residual reactive MgO during the post cure or after the initial exotherm reaction. The oil-MgO mixture thus acts in substantially the same way as the inhibitors used in the premix. Oils or other liquids incompatible with water, such as silicone oil, lubricating oils and naphthols, can also be used.

Similar results as set forth for Examples 2 and 3 are obtained with other inhibitors, such as stannous chloride, potassium siliconate, low sodium silicate, etc.

I claim:

1. A process for producing magnesium oxide hydrate cements which comprises forming a premix containing water and part of the magnesium oxide to be used to form the hydrate and in which the magnesium oxide is at least initially substantially unreactive with magnesium chloride hydrate, mixing the premix with the magnesium chloride hydrate and the remainder of the magnesium oxide in the reactive state, and curing the resulting composition, said unreactive magnesium oxide being capable of slowly reacting with the magnesium chloride hydrate after the initial reaction of the reactive magnesium oxide with the magnesium chloride hydrate.

2. A process for producing magnesium oxychloride hydrate cements which comprises forming a premix with part of the magnesium oxide to be used to form the hydrate, water and a reaction inhibitor for the magnesium oxide in a sufficient quantity to initially inhibit the reaction of the magnesium oxide with magnesium chloride hexahydrate, mixing the premix with the magnesium chloride hexahydrate and the remainder of the magnesium oxide which is in the reactive state, and curing the resultant composition, said inhibited magnesium oxide being capable of further reaction with the magnesium chloride hexahydrate after the initial reaction of the reactive magnesium oxide with the magnesium chloride hexahydrate.

3. The process of claim 2 in which the reaction inhibitor is phosphoric acid, a reactive phosphoric acid salt, a water soluble silicate or sol, a siliconate or tin chloride.

4. The process of claim 2 in which the reaction inhibitor is a lithium stabilized polysilicate.

5. The process of claims 2, 3 or 4 in which the amount of water in the premix is substantially all of the free water used to form the hydrate.

* * * * *

UNITED STATES PATENT AND TRADEMARK OFFICE
Certificate

Patent No. 4,352,694                                  Patented Oct. 15, 1982

Robert Smith-Johannsen

Application having been made by Robert Smith-Johannsen, the inventor named in the patent above identified, and Norcem A.S., the assignee, for the issuance of a certificate under the provisions of Title 35, Section 256, of the United States Code, adding the name of Trygve Eugen Marthinsen as a joint inventor, and a showing and proof of facts satisfying the requirements of the said section having been submitted, it is this 8th day of May 1984, certified that the name of the said Trygve Eugen Marthinsen is hereby added to the said patent as a joint inventor with the said Robert Smith-Johannsen.

Fred W. Sherling,
*Associate Solicitor.*